(12) United States Patent
Zhou et al.

(10) Patent No.: US 8,071,703 B2
(45) Date of Patent: Dec. 6, 2011

(54) SILICONE-CONTAINING PREPOLYMERS WITH DANGLING HYDROPHILIC POLYMER CHAINS

(75) Inventors: Jian S. Zhou, Duluth, GA (US); Frank Chang, Suwanee, GA (US); Arturo Norberto Medina, Suwanee, GA (US); Robert Scott, Alpharetta, GA (US)

(73) Assignee: Novartis AG, Basel (CH)

( * ) Notice: Subject to any disclaimer, the term of this patent is extended or adjusted under 35 U.S.C. 154(b) by 336 days.

(21) Appl. No.: 12/077,773

(22) Filed: Mar. 21, 2008

(65) Prior Publication Data

US 2008/0234457 A1   Sep. 25, 2008

Related U.S. Application Data

(60) Provisional application No. 60/896,326, filed on Mar. 22, 2007.

(51) Int. Cl.
 *C08F 30/08* (2006.01)
(52) U.S. Cl. .......................... 526/279; 523/107
(58) Field of Classification Search .................. 526/279; 523/107
See application file for complete search history.

(56) References Cited

U.S. PATENT DOCUMENTS

| | | |
|---|---|---|
| 4,136,250 A | 1/1979 | Mueller |
| 4,229,273 A | 10/1980 | Wajs ........................ 204/159.13 |
| 4,543,398 A | 9/1985 | Bany |
| 4,703,097 A | 10/1987 | Wingler |
| 4,837,289 A | 6/1989 | Mueller et al. ................. 526/279 |
| 5,070,169 A | 12/1991 | Robertson |
| 5,070,170 A | 12/1991 | Robertson |
| 5,219,965 A | 6/1993 | Valint et al. .................... 526/245 |
| 5,227,432 A | 7/1993 | Jung ............................. 525/286 |
| 5,244,981 A | 9/1993 | Seidner |
| 5,314,960 A | 5/1994 | Spinelli |
| 5,314,961 A | 5/1994 | Anton |
| 5,331,067 A | 7/1994 | Seidner |
| 5,336,797 A | 8/1994 | McGee et al. ................. 556/419 |
| 5,387,632 A | 2/1995 | Lai et al. ........................ 526/279 |
| 5,387,663 A | 2/1995 | McGee et al. ................. 526/279 |
| 5,449,729 A | 9/1995 | Lai ................................ 526/286 |
| 5,505,884 A | 4/1996 | Burke et al. .................... 264/1.1 |
| 5,563,184 A | 10/1996 | McGee et al. ................. 523/107 |
| 5,665,840 A | 9/1997 | Pohlmann et al. ........... 526/264 |
| 5,708,094 A | 1/1998 | Lai et al. ........................ 526/296 |
| 5,807,944 A | 9/1998 | Hirt |
| 5,981,669 A | 11/1999 | Valint et al. .................... 525/477 |
| 5,981,675 A | 11/1999 | Valint et al. .................... 526/279 |
| 5,998,498 A | 12/1999 | Vanderlaan et al. ........... 523/107 |
| 6,039,913 A | 3/2000 | Hirt |
| 6,043,328 A | 3/2000 | Domschke et al. ........... 526/279 |
| 6,444,776 B1 | 9/2002 | Holland |
| 6,762,264 B2 | 7/2004 | Kunzler et al. ................ 526/279 |
| 6,765,083 B2 | 7/2004 | Ford et al. ...................... 528/491 |
| 6,822,016 B2 | 11/2004 | McCabe et al. ................ 523/107 |
| 6,943,203 B2 | 9/2005 | Vanderlaan et al. ........... 523/107 |
| 7,052,131 B2 | 5/2006 | McCabe et al. ................ 351/160 |
| 7,091,283 B2 | 8/2006 | Mueller et al. ................. 525/292 |
| 7,238,750 B2 | 7/2007 | Mueller et al. ................. 525/292 |
| 7,247,692 B2 | 7/2007 | Laredo |
| 7,249,848 B2 | 7/2007 | Laredo et al. .................. 351/160 |
| 7,268,189 B2 | 9/2007 | Mueller et al. ................. 525/292 |
| 7,521,519 B1 | 4/2009 | Hirt |
| 7,566,754 B2 | 7/2009 | Müller |
| 2001/0037001 A1* | 11/2001 | Muller et al. ................ 525/329.4 |
| 2005/0237483 A1 | 10/2005 | Phelan .......................... 351/162 |
| 2006/0160957 A1 | 7/2006 | Muller |
| 2006/0235162 A1 | 10/2006 | Muller |
| 2008/0015315 A1 | 1/2008 | Chang |
| 2008/0021127 A1 | 1/2008 | Muller |
| 2008/0143003 A1 | 6/2008 | Phelan |
| 2008/0143958 A1 | 6/2008 | Medina |
| 2008/0231798 A1 | 9/2008 | Zhou |
| 2009/0143499 A1 | 6/2009 | Chang |
| 2010/0120938 A1 | 5/2010 | Phelan |
| 2010/0120939 A1 | 5/2010 | Phelan |

FOREIGN PATENT DOCUMENTS

| | | |
|---|---|---|
| DE | 37 10343 A1 | 3/1987 |
| EP | 0 216 074 B1 | 7/1986 |
| EP | 0 331 633 B1 | 2/1989 |
| EP | 0 395 583 B1 | 10/1990 |
| WO | WO 92/18548 | 10/1992 |
| WO | WO 92/09421 | 11/1992 |
| WO | WO 93/09084 | 5/1993 |
| WO | WO 93/23773 | 11/1993 |
| WO | WO 96/31791 | 10/1996 |
| WO | WO 98/25982 | 6/1998 |
| WO | WO 00/59970 | 12/2000 |
| WO | WO / 01/07523 A1 | 2/2001 |
| WO | 0171392 A1 | 9/2001 |

OTHER PUBLICATIONS

PCT International Search Report.
PCT Written Opinion of the International Searching Authority.

* cited by examiner

*Primary Examiner* — Kuo-Liang Peng
(74) *Attorney, Agent, or Firm* — Jian Zhou

(57) ABSTRACT

The invention provide a new class of silicone-containing prepolymers containing dangling hydrophilic polymer chains. This class of silicone-containing prepolymer is capable of being actinically crosslinked to form a silicone hydrogel material with a hydrophilic surface without post curing surface treatment. The present invention is also related to silicone hydrogel contact lenses made from this class of silicone-containing prepolymers and to methods for making the silicone hydrogel contact lenses.

6 Claims, No Drawings

SILICONE-CONTAINING PREPOLYMERS WITH DANGLING HYDROPHILIC POLYMER CHAINS

This application claims the benefit under 35 USC §119(e) of U.S. provisional application No. 60/896,326 filed Mar. 22, 2007, incorporated herein by reference in its entirety.

The present invention is related to a class of silicone-containing prepolymers and uses thereof. In particular, the present invention is related to silicone hydrogel contact lenses made from this class of silicone-containing prepolymers.

BACKGROUND

In recent years, soft silicone hydrogel contact lenses become popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen to permeate through the lens to the cornea and to have minimal adverse effects on corneal health.

However, all commercially available silicone hydrogel contact lenses are produced according to a conventional cast molding technique involving use of disposable plastic molds and a mixture of monomers and/or macromers. There are several disadvantages with such conventional cast-molding technique. For example, a traditional cast-molding manufacturing process must include lens extraction in which unpolymerized monomers must be removed from the lenses by using an organic solvent. Such lens extraction increases the production cost and decreases the production efficiency. In addition, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniform shrinkage after the injection molding. These dimensional changes in the mold may lead to fluctuations in the parameters of contact lenses to be produced (peak refractive index, diameter, basic curve, central thickness etc.) and to a low fidelity in duplicating complex lens design.

The above described disadvantages encountered in a conventional cast-molding technique can be overcome by using the so-called Lightstream Technology™ (CIBA Vision), which involves (1) a lens-forming composition being substantially free of monomers and comprising a substantially purified prepolymer with ethylenically-unsaturated groups, (2) reusable molds produced in high precision, and (3) curing under a spatial limitation of actinic radiation (e.g., UV), as described in U.S. Pat. Nos. 5,508,317, 5,583,463, 5,789,464, and 5,849,810. Lenses can be produced at relatively lower cost according to the Lightstream Technology™ to have high consistency and high fidelity to the original lens design.

In order to fully utilize the Lightstream Technology™ to make silicone hydrogel contact lenses, there is still a need for new actinically-crosslinkable prepolymers suitable for making silicone hydrogel contact lenses with desired bulk and surface properties according to the Lightstream Technology™.

SUMMARY OF THE INVENTION

The present invention, in one aspect, provides an actinically crosslinkable prepolymer. The prepolymer of the invention comprises: in the copolymer chain of the prepolymer, (1) siloxane units derived from one or more siloxane-containing monomers and/or one or more siloxane-containing macromers; (2) hydrophilic units derived from one or more hydrophilic monomers and/or one or more hydrophilic macromers; and (3) dangling hydrophilic polymer chains that are covalently attached to the copolymer chain and derived from at least one pre-formed hydrophilic polymer having one sole crosslinkable group, wherein the dangling hydrophilic chains are free of actinically-crosslinkable groups, wherein the pre-formed hydrophilic polymer has a molecular weight sufficient low to be efficiently and covalently incorporated in the prepolymer but sufficient high to provide a silicone hydrogel contact lens, which is obtained from the prepolymer, with a water contact angle of about 90 degrees or less without post-curing surface treatment when being present in the prepolymer in an amount of from about 2% to about 30% by weight, wherein the prepolymer is capable of being actinically crosslinked, in the absence of one or more monomers, to form the silicone hydrogel contact lens.

In another aspect, the invention provides a soft contact lens. The soft contact lens of the invention comprises: a silicone hydrogel material that is obtained by curing a lens-forming material in a mold, wherein the lens-forming material comprises an actinically crosslinkable or polymerizable prepolymer, wherein the prepolymer comprises (1) siloxane units derived from one or more siloxane-containing monomers and/or one or more siloxane-containing macromers; (2) hydrophilic units derived from one or more hydrophilic monomers and/or one or more hydrophilic macromers; and (3) dangling hydrophilic polymer chains that are covalently attached to the copolymer chain and derived from one or more pre-formed hydrophilic polymers each having one sole crosslinkable group, wherein the dangling hydrophilic chains are free of actinically-crosslinkable groups, wherein the pre-formed hydrophilic polymer has a molecular weight sufficient low to be efficiently and covalently incorporated in the prepolymer but sufficient high to provide the soft contact lens with a water contact angle of about 90 degrees or less without post-curing surface treatment when being present in the prepolymer in an amount of from about 2% to about 30% by weight.

In a further aspect, the invention provides a method for producing soft contact lenses. The method comprises the steps of: comprising the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises one or more actinically crosslinkable prepolymers and is substantially free of vinylic monomer and/or crosslinking agent, wherein each of said one or more prepolymers comprises (1) siloxane units derived from one or more siloxane-containing monomers and/or one or more siloxane-containing macromers; (2) hydrophilic units derived from one or more hydrophilic monomers and/or one or more hydrophilic macromers; and (3) dangling hydrophilic polymer chains that are covalently attached to the copolymer chain and derived from one or more pre-formed hydrophilic polymers each having one sole crosslinkable group, wherein the dangling hydrophilic chains are free of actinically-crosslinkable groups, wherein the pre-formed hydrophilic polymer has a molecular weight sufficient low to be efficiently and covalently incorporated in the prepolymer but sufficient high to provide the soft contact lens with a water contact angle of about 90 degrees or less without post-curing surface treatment when being present in the prepolymer in an amount of from about 2% to about 30% by weight; and actinically irradiating the composition in the mold to crosslink said one or more crosslinkable prepolymers to form the contact lens.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized. Low molecular weight typically means average molecular weights less than 700 Daltons.

An "actinically-polymerizable monomer" refers to a monomer which can be polymerized actinically. In accordance with the invention, an actinically-polymerizable monomer can be a vinylic monomer or a compound comprising two thiol groups. A compound with two thiol groups can participate in thiol-ene step-growth radical polymerization with a monomer with vinyl group to form a polymer. Step-growth radical polymerization can be used in making contact lenses, as described in a commonly-owned copending U.S. patent application No. 60/869,812 filed Dec. 13, 2006 (entitled "PRODUCTION OF OPHTHALMIC DEVICES BASED ON PHOTO-INDUCED STEP GROWTH POLYMERIZATION", herein incorporated in reference in its entirety.

A "siloxane-containing monomer" refers to a monomer containing a divalent radical of

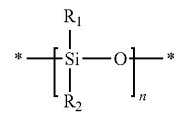

in which $R_1$ and $R_2$ are independently a monovalent $C_1$-$C_{10}$ alkyl, $C_1$-$C_{10}$ ether, $C_1$-$C_{10}$ fluoroalkyl, $C_1$-$C_{10}$ fluoroether or $C_6$-$C_{18}$ aryl radical, which may comprise hydroxy group, primary, secondary, or tertiary amine group, carboxy group, or carboxylic acid; n is an integer of 4 or higher.

A "vinylic monomer", as used herein, refers to a monomer that has an ethylenically unsaturated group and can be polymerized actinically or thermally.

The term "olefinically unsaturated group" or "ethylentically unsaturated group" is employed herein in a broad sense and is intended to encompass any groups containing a >C=C< group. Exemplary ethylenically unsaturated groups include without limitation acryloyl, methacryloyl, allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

The term "fluid" as used herein indicates that a material is capable of flowing like a liquid.

A "hydrophilic monomer" refers to a monomer which can be polymerized to form a polymer that is water-soluble or can absorb at least 10 percent by weight of water.

A "hydrophobic monomer", as used herein, refers to a vinylic monomer which is polymerized to form a polymer that is insoluble in water and can absorb less than 10 percent by weight water.

A "macromer" refers to a medium and high molecular weight compound which can be polymerized and/or crosslinked. Medium and high molecular weight typically means average molecular weights greater than 700 Daltons.

An "actinically-polymerizable macromer" refers to a macromer which can be polymerized actinically. In accordance with the invention, an actinically-polymerizable macromer can be a macromer with one or more ethylenically unsaturated groups or with two or more thiol groups, which can participate in either free radical chain growth polymerization or thiol-ene step-growth radical polymerization. Preferably, a macromer contains ethylenically unsaturated groups and can be polymerized actinically or thermally.

A "prepolymer" refers to a starting polymer which contains multiple actinically crosslinkable groups and can be cured (e.g., crosslinked) actinically to obtain a crosslinked polymer having a molecular weight much higher than the starting polymer.

"Actinically crosslinkable groups" refers to ethylenically unsaturated groups or thiol groups.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "ethylenically functionalize" in reference to a copolymer or a compound is intended to describe that one or more actinically crosslinkable groups have been covalently attached to a copolymer or compound through the pendant or terminal functional groups of the copolymer or the compound according to a coupling process.

As used herein, the term "multiple" refers to at least two, preferably at least three.

As used herein, a "pre-formed and crosslinkable hydrophilic polymer" refers to a hydrophilic polymer that contains one or more crosslinkable groups and is prepared or obtained prior to being added in a reaction mixture for making a prepolymer of the invention.

The term "dangling hydrophilic polymer chains" in reference to a prepolymer of the invention is intended to describe that the prepolymer comprises hydrophilic polymer chains which each are anchored to the main chain of the prepolymer through one single covalent linkage (preferably at one of the ends of the hydrophilic polymer chain).

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. For example, a spatial limitation of UV radiation can be achieved by using a mask or screen that has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region. The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

"Surface modification", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, plasma processes in which an ionized gas is applied to the surface of an article (see, for example, U.S. Pat. Nos. 4,312,575 and 4,632,844 herein incorporated by reference in its entirety); a surface treatment by energy other than plasma (e.g., a static electrical charge, irradiation, or other energy source); chemical treatments; the grafting of hydrophilic monomers or macromers onto the surface of an article; mold-transfer coating process disclosed in U.S. Pat. No. 6,719,929 (herein incorporated by reference in its entirety); the incorporation of wetting agents into a lens formulation for making contact lenses (i.e., surface treatment prior to polymerization) proposed in U.S. Pat. Nos. 4,045,547, 4,042,552, 5,198,477, 5,219,965, 6,367,929 and 6,822,016, 7,279,507 (herein incorporated by references in their entireties); reinforced mold-transfer coating disclosed in PCT Patent Application Publication No. WO 2007/146137 (herein incorporated by reference in its entirety); and layer-by-layer coating ("LbL coating") obtained according to methods described in U.S. Pat. Nos. 6,451,871, 6,719,929, 6,793,973, 6,811,805, 6,896,926 (herein incorporated by references in their entireties).

Exemplary plasma gases and processing conditions are described in U.S. Pat. Nos. 4,312,575 and 4,632,844. The plasma gas is preferably a mixture of lower alkanes and nitrogen, oxygen or an inert gas.

"LbL coating", as used herein, refers to a coating that is not covalently attached to a contact lens or a mold half and is obtained through a layer-by-layer ("LbL") deposition of polyionic (or charged) and/or non-charged materials on the lens or mold half. An LbL coating can be composed of one or more layers.

As used herein, a "polyionic material" refers to a polymeric material that has a plurality of charged groups or ionizable groups, such as polyelectrolytes, p- and n-type doped conducting polymers. Polyionic materials include both polycationic (having positive charges) and polyanionic (having negative charges) materials.

Formation of an LbL coating on a contact lens or mold half may be accomplished in a number of ways, for example, as described in U.S. Pat. Nos. 6,451,871, 6,719,929, 6,793,973, 6,811,805, 6,896,926 (herein incorporated by references in their entirety).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (advancing angle measured by Wilhelmy Plate method), which is obtained by averaging measurements of at least 3 individual contact lenses.

An "antimicrobial agent", as used herein, refers to a chemical that is capable of decreasing or eliminating or inhibiting the growth of microorganisms such as that term is known in the art.

"Antimicrobial metals" are metals whose ions have an antimicrobial effect and which are biocompatible. Preferred antimicrobial metals include Ag, Au, Pt, Pd, Ir, Sn, Cu, Sb, Bi and Zn, with Ag being most preferred.

"Antimicrobial metal-containing nanoparticles" refer to particles having a size of less than 1 micrometer and containing at least one antimicrobial metal present in one or more of its oxidation states.

"Antimicrobial metal nanoparticles" refer to particles which is made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

"Stabilized antimicrobial metal nanoparticles" refer to antimicrobial metal nanoparticles which are stabilized by a stabilizer during their preparation. Stabilized antimicrobial metal nano-particles can be either positively charged or negatively charged or neutral, largely depending on a material (or so-called stabilizer) which is present in a solution for preparing the nano-particles and can stabilize the resultant nano-particles. A stabilizer can be any known suitable material. Exemplary stabilizers include, without limitation, positively charged polyionic materials, negatively charged polyionic materials, polymers, surfactants, salicylic acid, alcohols and the like.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3\ oxygen)/(cm^2)(sec)(mm\ Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3\ oxygen)(mm)/(cm^2)(sec)(mm\ Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where
n'=rate of ion transport [mol/min]
A=area of lens exposed [$mm^2$]
D=Ionoflux Diffusion Coefficient [$mm^2$/min]
dc=concentration difference [mol/L]
dx=thickness of lens [mm]

The Ionoton Ion Permeability Coefficient, P, is then determined in accordance with the following equation:

$$\ln(1-2C(t)/C(0)) = -2APt/Vd$$

where:
C(t)=concentration of sodium ions at time t in the receiving cell
C(0)=initial concentration of sodium ions in donor cell
A=membrane area, i.e., lens area exposed to cells
V=volume of cell compartment (3.0 ml)
d=average lens thickness in the area exposed
P=permeability coefficient An Ionoflux Diffusion Coefficient, D, of greater than about $1.5 \times 10^{-6}$ $mm^2$/min is preferred, while greater than about $2.6 \times 10^{-6}$ $mm^2$/min is more preferred and greater than about $6.4 \times 10^{-6}$ $mm^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

In general, the invention is directed to a class of actinically crosslinkable silicone-containing prepolymers with dangling hydrophilic polymer chains. Such prepolymers can be used to prepare silicone hydrogel contact lenses, in particularly according to the Lightstream Technology™ (CIBA Vision). It is known that a silicone hydrogel material typically has a surface or at least some areas of its surface, which is hydrophobic (non-wettable). Hydrophobic surface or surface areas will up-take lipids or proteins from the ocular environment and may adhere to the eye. Thus, a silicone hydrogel contact lens will generally require a surface modification which is typically carried out after cast-molding of the lens.

However, a prepolymer of the invention can be used to prepare silicon hydrogel contact lenses with a high oxygen permeability and a hydrophilic surface without post-curing surface treatment. It is believed that when a solution of a prepolymer of the invention is introduced in a mold for making contact lenses, the dangling hydrophilic polymer chains of the prepolymer is preferably adsorbed at the interface between the mold and the prepolymer solution. Where the dangling hydrophilic polymer chains is present in the prepolymer in an amount sufficient, an interfacial films, which is composed essentially of dangling hydrophilic polymer chains and has adequate thickness, can be formed at the mold-solution interface prior to curing (polymerization) and subsequently preserved after curing. As such, one can make a silicone hydrogel contact lens with a hydrophilic interfacial film thereon without any post curing surface treatment.

There are several potential unique features associated with use of prepolymers of the invention in making silicone hydrogel contact lens. First, a prepolymer of the invention can be cured actinically on a timescale of seconds. Second, a lens-forming formulation (polymerizable composition) can be a solution of the prepolymer which has been substantially purified (i.e., removing substantially starting materials for making the prepolymer). No lens extraction is necessary after curing of the lens. Third, surface modification occurs prior to the curing of the lens. No post curing surface treatment is required. Fourth, prepolymers of the invention can fully utilize the advantages provided by the Lightstream Technology™ in make silicone hydrogel contact lenses at a relatively lower cost and at high consistency and high fidelity to the original lens design.

The present invention, in one aspect, provides an actinically crosslinkable prepolymer. The prepolymer of the invention comprises: in the copolymer chain of the prepolymer, (1) siloxane units derived from one or more siloxane-containing monomers and/or one or more siloxane-containing macromers; (2) hydrophilic units derived from one or more hydrophilic monomers and/or one or more hydrophilic macromers; and (3) dangling hydrophilic polymer chains that are covalently attached to the copolymer chain and derived from at least one pre-formed hydrophilic polymer having one sole crosslinkable group, wherein the dangling hydrophilic chains are free of actinically-crosslinkable groups, wherein the pre-formed hydrophilic polymer has a molecular weight sufficient low to be efficiently and covalently incorporated in the prepolymer but sufficient high to provide a silicone hydrogel contact lens, which is obtained from the prepolymer, with a water contact angle of about 90 degrees or less without post-curing surface treatment and when being present in the prepolymer in an amount of from about 2% to about 30% by weight, wherein the prepolymer is capable of being actinically crosslinked, in the absence of one or more monomers, to form the silicone hydrogel contact lens.

A prepolymer of the invention comprises multiple actinically crosslinkable groups selected from the group consisting of ethylenically unsaturated groups and thiol groups.

Where crosslinking of a prepolymer of the invention is based on the mechanism of free radical chain-growth polymerization, the prepolymer comprises preferably at least three ethylenically unsaturated groups.

Where crosslinking of a prepolymer of the invention is based on the mechanism of thiol-ene step-growth radical polymerization, the actinically crosslinkable groups of the prepolymer preferably comprises at least three thiol groups or at least three ene-containing groups. An "ene-containing group" is intended to describe a mono-valent or divalent radical that contains a carbon-carbon double which is not directly linked to a carbonyl group (—CO—), nitrogen atom, or oxygen atom, is preferably defined by any one of formula (I)-(III)

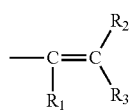
(I)

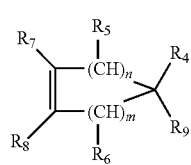
(II)

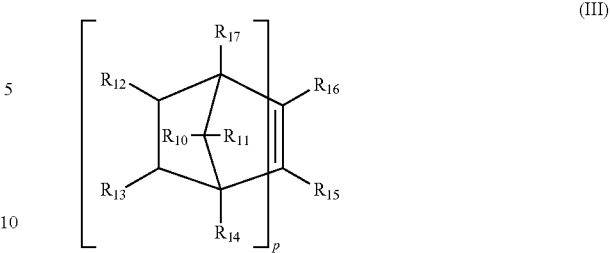
(III)

in which $R_1$ is hydrogen, or $C_1$-$C_{10}$ alkyl; $R_2$ and $R_3$ independent of each other are hydrogen, $C_1$-$C_{10}$ alkene divalent radical, $C_1$-$C_{10}$ alkyl, or —$(R_{18})_a$—$X_1)_b$—$R_{19}$ in which $R_{18}$ is $C_1$-$C_{10}$ alkene divalent radical, $X_1$ is an ether linkage (—O—), a urethane linkage (—N), a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a and b independent of each other is zero or 1, provided that only one of $R_2$ and $R_3$ is a divalent radical; $R_4$—$R_9$, independent of each other, are hydrogen, $C_1$-$C_{10}$ alkene divalent radical, $C_1$-$C_{10}$ alkyl, or —$(R_{18})_a$—$(X_1)_b$—$R_{19}$, optionally $R_4R_9$ are linked through an alkene divalent radical to form a cyclic ring, provided that at least one of $R_4$—$R_9$ are divalent radicals; n and m independent of each other are integer number from 0 to 9, provided that the sum of n and m is an integer number from 2 to 9; $R_{10}$—$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{19}$, p is an integer number from 1 to 3, provided that only one or two of $R_{10}$—$R_{17}$ are divalent radicals.

Where the prepolymer comprises multiple ene-containing groups, these groups undergo thiol-ene step-growth radical polymerization in the presence of thiol groups which can be provided by a step-growth-crosslinking agent having two or more thiol groups. Similarly, where the prepolymer comprises multiple thiol groups, these groups undergo thiol-ene step-growth radical polymerization in the presence of ene-containing groups which can be provided by a step-growth-crosslinking agent having two or more ene-containing groups.

In accordance with the invention, the dangling hydrophilic polymer chains of the prepolymer each are free of any actinically crosslinkable groups. The dangling hydrophilic polymer chains are present in the prepolymer in an amount sufficient to impart a silicone hydrogel material, obtained by curing the prepolymer, a hydrophilic surface without post-curing surface treatment.

The dangling hydrophilic polymer chains of the prepolymer is derived from at least one pre-formed hydrophilic polymer having one sole crosslinkable group. The sole crosslinkable group can be any functional group capable of participating a covalently coupling reaction described below or any actinically-crosslinkable group which can participate in a polymerization for preparing a intermediary copolymer described below. The pre-formed hydrophilic polymer with one sole crosslinkable group has a molecular weight sufficient low to be efficiently and covalently incorporated in the prepolymer. It is believed that if the molecular weight of the pre-formed hydrophilic polymer is too high, the covalent incorporation of the pre-formed hydrophilic polymer into the prepolymer would not be efficient in a coupling, especially in a free-radical polymerization. Uncrosslinked pre-formed hydrophilic polymer is removed during the ultra-filtration of the prepolymer. In addition, the pre-formed hydrophilic polymer with one sole crosslinkable group has a molecular weight sufficient high to provide a silicone hydrogel contact lens, which is obtained from the prepolymer, with a water contact angle of about 90 degrees or less, preferably about 80 degrees or less, more preferably about 70 degrees or less, even more preferably about 60 degrees or less, without post-curing surface treatment and when being present in the prepolymer in an amount of from about 2% to about 30% by weight. In accordance with the invention, the molecular weight of a pre-formed hydrophilic polymer is from about 500 daltons to about 20,000 daltons, preferably from about 1000 daltons to about 10,000 daltons, more preferably from about 2000 daltons to about 6000 daltons.

A prepolymer of the invention comprises: from about 15% to about 70% by weight, preferably from about 25% to about 80%, of siloxane units derived from one or more siloxane-containing monomers and/or one or more siloxane-containing macromers; from about 10% to about 80%, preferably from about 15% to 45% by weight, of hydrophilic units derived from one or more hydrophilic monomers and/or one or more hydrophilic macromers; and about 2% to about 30%, preferably from about 4% to about 20% by weight, of dangling hydrophilic polymer chains derived from one or more preformed and crosslinkable hydrophilic polymers.

In accordance with the invention, a prepolymer of the invention can be obtained from an intermediary copolymer with pendant or terminal functional groups and dangling hydrophilic polymer chains by covalently attaching actinically crosslinkable groups to the intermediary copolymer through the pendant or terminal functional groups, according to any covalently coupling method.

It is well known in the art that a pair of matching reactive groups can form a covalent bond or linkage under known coupling reaction conditions, such as, oxidation-reduction conditions, dehydration condensation conditions, addition conditions, substitution (or displacement) conditions, Diels-Alder reaction conditions, cationic crosslinking conditions, and epoxy hardening conditions. For example, an amino group reacts with aldehyde group to form a Schiff base which may further be reduced; an amino group reacts with an acid chloride to form an amide linkage (—CO—N—); an amino group reacts with an isocyanate to form a urea linkage; an hydroxyl reacts with an isocyanate to form a urethane linkage; an hydroxyl reacts with an epoxy to form an ether linkage (—O—); a hydroxyl reacts with an acid chloride to form an ester linkage.

Exemplary covalent bonds or linkage, which are formed between pairs of crosslinkable groups, include without limitation, ester, ether, acetal, ketal, vinyl ether, carbamate, urea, urethane, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary reactive groups include hydroxyl group, amine group, amide group, anhydride group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy.

It is understood that coupling agents may be used. For example, a carbodiimide can be used in the coupling of a carboxyl and an amine to form an amide linkage between the molecules being coupled. Examples of carbodiimides are 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide, or mixtures thereof. N-hydroxysuccinimide (NHS) or N-hydroxysulfosuccinimide may be desirably included in carbodiimide (e.g., EDC)-mediated coupling reaction to improve coupling (conjugation) efficiency. EDC couples NHS to carboxyls, resulting in an NHS-activated site on a molecule. The formed NHS-ester can react with amines to form amides.

Preferably, the functional group of the intermediary copolymer is selected from the group consisting of hydroxyl groups (—OH), primary amino groups (—$NH_2$), secondary amino groups (—NHR), carboxyl groups (—COOH), epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or I), acid anhydride groups, and combinations thereof.

Any copolymers, which include siloxane units derived from a siloxane-containing monomer or macromer, hydrophilic units derived from a hydrophilic monomer or polymer in the copolymer chain, dangling hydrophilic polymer chains, and pendant or terminal functional groups, can be used as an intermediary copolymer in the invention. Such copolymer should be soluble in water, an organic solvent, a mixture of water and at least one organic solvent, or a mixture of organic solvents.

An intermediary copolymer can be obtained by copolymerization of a mixture comprising (a) at least one linear siloxane-containing compound with two terminal first or second functional groups (i.e., having two functional groups one at each of two opposite ends), (b) at least one linear hydrophilic monomer or polymer with two terminal first or second functional groups, (c) at least one hydrophilic polymer with only one first or second functional group, and (d) one or more branching agents which independently of each other are an organic compound with three or more first or second functional groups, wherein the first and second functional groups are different from each other and selected from the group consisting of amine group, hydroxyl, carboxy, isocyanate, epoxy, and acid halide group, wherein the first and second functional groups are different from each other but coreactive with each other in the presence or absence of a coupling agent to form a covalent linkage selected from the group consisting of urethane, urea, ether, and amide, wherein the ratio of molar equivalents of the first functional groups to the second functional groups or of the second function groups to the first functional groups in the mixture is from about 1.1 to about 20, preferably from about 1.1 to about 5, more preferably from about 1.1 to about 3.

Where the first functional groups are amine groups and the second functional groups are isocyanate group, the obtained intermediary copolymers are amine-capped polyureas.

Where the first functional groups are isocyanate groups and the second functional groups are amine group, the obtained intermediary copolymers are isocyanate-capped polyureas.

Where the first functional groups are hydroxy groups and the second functional groups are isocyanate group, the obtained intermediary copolymers are hydroxy-capped polyurethanes.

Where the first functional groups are isocyanate groups and the second functional groups are hydroxy group, the obtained intermediary copolymers are isocyanate-capped polyurethanes.

Where the first functional groups are amine groups and the second functional groups are acid halide group, the obtained intermediary copolymers are amine-capped polyamides.

Where the first functional groups are amine groups and the second functional groups are carboxyl groups, the intermediary copolymers obtained in the presence of EDC are amine-capped polyamides.

Where the first functional groups are carboxyl groups and the second functional groups are amine groups, the intermediary copolymers obtained in the presence of EDC are carboxyl-capped polyamides.

Where the first functional groups are hydroxy groups and the second functional groups are epoxy group, the obtained intermediary copolymers are hydroxy-capped polyethers.

Exemplary linear siloxane-containing compounds with two terminal functional groups selected from the consisting of amino groups, hydroxyl groups, acid chloride groups, and epoxy groups are difunctional group-terminated polysiloxane, such as, for example, poly(dialkylsiloxane), poly(diarylsiloxane), polyarylalkylsiloxane, copolymers of different dialkysiloxanes, copolymers of dialkylsiloxane with diarylsiloxane or arylalkylsiloxane, or the likes. Preferably, a silioxane-containing compound is a difunctional group terminated polydimethylsiloxane. Various difunctional group terminated functional polysiloxanes can be obtained from commercial suppliers (e.g., from Gelest, Inc, or Fluorochem). Otherwise, one skilled in the art will know how to prepare such difunctional group-terminated polysiloxanes according to procedures known in the art and described in Journal of Polymer Science—Chemistry, 33, 1773 (1995) (herein incorporated by reference in its entirety).

Exemplary hydrophilic monomer or hydrophilic macromers, with two terminal functional groups selected from the consisting of amino groups, hydroxyl groups, acid chloride groups, and epoxy groups, are difunctional group-terminated poly(ethylene glycol) (PEG), difunctional group-terminated block copolymers of ethylene oxide and propylene oxide ((PEG/PPG block copolymers, e.g., poloxamers or poloxamine), difunctional group-terminated polymers polyalkylacrylamides, difunctional group-terminated polyalkylmethacrylamides, difunctional group-terminated polyvinylpyrrolidones, difunctional group-terminated copolymers of N-vinylpyrrolidone with one or more vinylic monomers (such as, e.g., dialkylaminoalkylacrylate, dialkylaminoalkylmethacrylate, N,N-dialkylacrylamide, N,N-dialkylmethacrylamide, vinylacetate, or mixture thereof), diamine- or dicarboxyl-terminated polyvinylalcohols (derived from methanolysis or hydrolysis of functional group terminated polyvinylacetates), and difunctional group-terminated copymers (preferably subjected to methanolysis or hydrolysis) of vinylacetate with one or more vinylic monomers (e.g., dialkylaminoalkylacrylate, dialkylaminoalkylmethacrylate, N,N-dialkylacrylamide, N,N-dialkylmethacrylamide, or mixture thereof.

Various amine-terminated PEGs, hydroxyl-terminated PEGs, and epoxy-terminated PEGs can be obtained from commercial suppliers, such as, Polyscience, and Shearwater Polymers, inc., etc.

In accordance with the invention, any hydrophilic vinylic monomers without primary amino group, hydroxyl group, isocyanate group, or epoxy group can be used in the preparation of difunctional group-terminated precursor polymers or copolymers. Examples of such hydrophilic vinylic monomers includes N,N-dialkylacrylamide, N,N-dialkylmethacrylamide, N-vinylpyrrolidone (NVP), dialkylaminoalkylacrylate, dialkylaminoalkylmethacrylate. Examples of preferred difunctional group-terminated hydrophilic polymers or copolymers includes difunctional group-terminated poly(N,N-dimethylacrylamide (poly(DMA)), difunctional group-terminated poly(N-vinylpyrrolidone) (PVP), difunctional group-terminated DMA/NVP copolymers, difunctional group-terminated copolymers of NVP/dimethylaminoethyl-methacrylate, difunctional group-terminated DMA/N-octylacrylamide copolymers, difunctional group-terminated NVP/N-octylacrylamide copolymers, diamine terminated polyvinyl acohol, dicarboxyl terminated polyvinyl alcohol, diamine terminated vinylacetate/NVP copolymer (preferably subjected to methanolysis or hydrolysis), dicarboxyl terminated vinylacetate/NVP copolymer (preferably subjected to methanolysis or hydrolysis), diamine terminated vinylacetate/DMA copolymer (preferably subjected to methanolysis or hydrolysis), dicarboxyl terminated vinylacetate/DMA copolymer (preferably subjected to methanolysis or hydrolysis), the likes.

Dihydroxy- or diamine-terminated precursor polymers or copolymers can be prepared according to procedures described in U.S. Pat. No. 6,218,508, herein incorporated by reference in its entirety. For example, one or more hydrophilic vinylic monomers without primary amino group, hydroxyl group, isocyanate group, carboxyl or epoxy group and a chain transfer agent (e.g., 2-mercaptoethanol, 2-aminoethanethiol, 2-mercaptopropinic acid, thioglycolic acid, thiolactic acid, or other hydroxymercaptanes, aminomercaptans, or carboxyl-containing mercaptanes) are copolymerized (thermally or actinically) with a vinylic monomer with a hydroxyl-, carboxyl- or amine-group, in the presence of an initiator. Preferably, the polymerizable mixture for preparing such precursor polymers or copolymers is substantially free of crosslinking agent (i.e., a compound having two or more ethylenically unsaturated groups).

The chain transfer agent with amine, hydroxyl or carboxyl group can be used to control the molecular weight of the resultant polymer or copolymer and to provide functionality (amine, hydroxyl, or carboxyl group) for subsequent functionalization of the resultant polymer or copolymer. The chain transfer agent forms a terminal end of the resultant hydrophilic polymer or copolymer, with the hydroxyl, amine or carboxyl group providing the resultant polymer or copolymer with a terminal hydroxyl, amine or carboxy group. The hydroxyl-, carboxyl or amine-containing vinylic monomer provides another terminal hydroxyl, carboxyl or amino functionality to the resultant polymer or copolymer.

Generally, the molar ratio of chain transfer agent to that of one or more hydrophilic vinylic monomers is from about 1:5 to about 1:100, whereas the molar ratio of chain transfer agent to the vinylic monomer with a hydroxyl- or amino-group is 1:1. The molar ratio of chain transfer agent to the hydrophilic vinylic monomer without primary amino group, hydroxyl group, isocyanate group, or epoxy group (e.g., DMA, NVP) is selected to obtain a polymer or copolymer with a molecular weight of preferably from about 200 to about 4,000, more preferably from about 500 to about 2,500 Daltons. It is understood that the resultant polymer or copolymer can be polymerized in the presence of a diisocynate to obtain a new polymer or copolymer with larger molecular weight and two terminal hydroxyl or amine groups. Any alkyl or aryl diisocyanates can be used for such purpose. Preferred diisocyanates include isophorone diisocyanate, hexamethyl-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl) cyclohexane, and cyclohexane diisocyanate.

Diepoxy-, diisocyanate, or diacidchloride-terminated precursor polymers or copolymers of one or more hydrophilic vinylic monomers can be prepared by covalently attaching epoxy, isocyanate, or acidchloride groups to the above-obtained dihydroxy- or diamine-terminated polymers or copolymers of one or more hydrophilic vinylic monomers according to any known procedures.

Exemplary hydrophilic precursor polymers or copolymers, with one terminal functional group selected from the group consisting of amino group, hydroxyl group, acid chloride group, carboxyl group, and epoxy group, are mono-functional group-terminated hydrophilic polymers including monofunctional group-terminated poly(ethylene glycol) (PEG), monofunctional group-terminated PEG/PPG block copolymers, monofunctional group-terminated polyalkylacrylamides, monofunctional group-terminated polyalkylmethacrylamides, monofunctional group-terminated polyvinylpyrrolidones, monofunctional group-terminated copolymers of N-vinylpyrrolidone with one or more vinylic monomers (such as, e.g., dialkylaminoalkylacrylate, dialkylaminoalkylmethacrylate, N,N-dialkylacrylamide, N,N-dialkylmethacrylamide, vinylacetate, or mixture thereof), monofunctional group-terminated polyvinylalcohols (derived from methanolysis or hydrolysis of functional group terminated polyvinylacetates), and monofunctional group-terminated copoymers (preferably subjected to methanolysis or hydrolysis) of vinylacetate with one or more vinylic monomers (e.g., dialkylaminoalkylacrylate, dialkylaminoalkylmethacrylate, N,N-dialkylacrylamide, N,N-dialkylmethacrylamide, or mixture thereof).

Various monofunctional terminated PEGs can be obtained from Shearwater Polymers, Inc. Preferred monofunctional-terminated PEGs are those PEGs with one amino, hydroxyl, acid chloride, or epoxy group at one terminus and a methoxy or ethoxy group at the other terminus.

Monofunctional group-terminated precursor polymers or copolymers can be prepared according to procedures similar to those described in U.S. Pat. No. 6,218,508, herein incorporated by reference in its entirety. For example, one or more hydrophilic vinylic monomer without functional group (i.e., primary amino group, hydroxyl group, isocyanate group, carboxyl group, or epoxy group) and a chain transfer agent (e.g., 2-mercaptoethanol, 2-aminoethanethiol, 2-mercaptopropinic acid, thioglycolic acid, thiolactic acid, or other hydroxymercaptanes, aminomercaptans, or carboxyl-containing mercaptanes) are copolymerized (thermally or actinically) in the presence or absence of an initiator to obtain a monohydroxy-, moncarboxyl-, or monoamine-terminated hydrophilic polymer or copolymer. Generally, the molar ratio of chain transfer aget to that of one or more hydrophilic vinylic monomers is from about 1:5 to about 1:100. The molar ratio of chain transfer agent to the hydrophilic vinylic monomer without functional group (e.g., DMA, NVP) is selected to obtain a polymer or copolymer with a molecular weight of from about 500 to about 20,000, preferably from about 1000 to about 10,000, more preferably from about 2000 to about 6000 Daltons. Monoepoxy-, monoisocyanate-, or monoacidchloride-terminated polymers or copolymers of one or more hydrophilic vinylic monomers can be prepared by covalently attaching epoxy, isocyanate, or acidchloride groups to the above-obtained monohydroxy- or monoamine-terminated polymers or copolymers of one or more hydrophilic vinylic monomers according to any known procedures. Use of monofunctional group-terminated polymers or copolymers with higher molecular weight may ensure that the interfacial film on a silicone hydrogel material or lens made from a prepolymer of the invention has adequate thickness and coverage.

Alternatively, monofunctional group-terminated precursor polymers or copolymers can be prepared by polymerizing the one or more hydrophilic monomers in the presence of a hydroxyl-, amine-, or carboxyl-containing free radical initiator at a molar ratio of intiator to the hydrophilic monomers of from about 1:30 to about 1:700. Examples of initiators with amine, hydroxyl, or carboxy group are azo initiators, such as, e.g., 2,2'-Azobis{2-[1-(2-hydroxyethyl)-2-imidazolin-2-yl]propane}dihydrochloride, 2,2'-Azobis [2-methyl-N-[1,1-bis(hydroxymethyl)-2-hydroxyethyl]propionamide, 2,2'-Azobis[2-methyl-N-(2-hydroxyethyl)propionamide], or 2,2'-Azobis {2-methyl-N-[2-(1-hydroxybutyl)]propionamide}, 2,2'-Azobis(2-methylpropionamide)dihydrochloride, 2,2'-Azobis[N-(2-carboxyethyl)-2-methylpropionamidine]tetrahydrate, or the likes.

Other examples of preferred monoethylenically functionalized hydrophilic polymer includes without limitation: mono(meth)acrylate terminated polyoxazoline; mono(meth)acrylate terminated poly(metharylate-co-mono(math)acrylate PEG); Mono(meth)acrylate terminated poly(glycerol methacrylate); Mono(meth)acrylate terminated poly(diethylaminoethyl (meth)acrylate); Mono(meth)acrylate terminated poly(dimethyl acrylamide); Mono(meth)acrylamide terminated poly(dimethyl acrylamide); and monoethylenically functionalized hydrophilic polymer with short dangling PEG chains (i.e., PEG having a molecular weight less than about 400 dalton).

Where mono- or di-functional group terminated hydrophilic precursor polymers or copolymers are polyvinyl alcohols or polyvinylalcohol copolymers, the terminal functional groups preferably are amine or carboxyl groups. In general, isocyanate groups would first react with amine groups even in the presence of hydroxyl groups. Also, amine groups or carboxy groups will participate in EDC mediated coupling reaction whereas hydroxyl groups will not.

Examples of preferred triamine or polyamines include without limitation diethylenetriamine, N-2'-aminoethyl-1,3-propylenediamine, N,N-bis(3-aminopropyl)-amine, N,N-bis(6-aminohexyl)amine and triethylenetetramine.

Examples of preferred triisocyanates include without limitation the isocyanurate trimer of hexamethylene diisocyanate, 2,4,6-toluene triisocyanate, p,p',p"-triphenylmethane triisocyanate, and the trifunctional trimer (isocyanurate) of isophorone diisocyanate. Preferably, a polyisocyanate is a $C_6$-$C_{45}$ cycloaliphatic or aliphatic-cycloaliphatic compound containing 4-6 isocyanate groups and at least one heteroatom selected from the group consisting of oxygen and nitrogen.

Examples of organic tri-ols or poly-ols are glycerol, diglycerol, triglycerol, 1,1,1-trishydroxymethylethane, 1,1,1-trishydroxymethylpropane, 1,2,4-butanetriol, 1,2,6-hexanetriol, erythritol, pentaerythritol, di- or tripentaerythritol, arabitol, sorbitol, disorbitol or mannitol and mixtures thereof.

Preferred tri- or polyacid halides (i.e., di- or polycarbonyl chloride) are triacid chlorides, triacid bromides, diacid chlorides and diacid bromides. Examples of triacid chlorides are trimesoyl chloride, cyclohexane-1,3,5-tricarbonyl chloride, trimer acid chloride and the like.

Examples of tri-and polyepoxy compounds are DENACOL series compounds supplied by Nagase and triglycidylisocyanurate (TGIC).

In a preferred embodiment, a branching agent is an organic compound comprising three functional groups, wherein the functional groups are selected from the group consisting of amino groups, hydroxyl groups, acid chloride groups, and epoxy groups.

In accordance with the invention, a prepolymer of the invention can also be obtained from an intermediary copolymer with pendant or terminal functional groups but without dangling hydrophilic polymer chains by covalently attaching actinically crosslinkable groups and at least one monofunctional group-terminated hydrophilic polymer to the intermediary copolymer through the pendant or terminal functional groups, according to any covalently coupling method.

In accordance with the invention, a prepolymer of the invention can further be obtained from a prepolymer having multiple actinically crosslinkable groups and pendant or terminal functional groups but without dangling hydrophilic polymer chains, by covalently attaching at least one monofunctional group-terminated hydrophilic polymer to the intermediary copolymer through the pendant or terminal functional groups, according to any covalently coupling method.

The mixture for preparing an intermediary copolymer can be a melt (solventless) or a solution in which all necessary component is dissolved in an inert solvent (i.e., should not interfer with the reaction between the reactants in the mixture), such as water, an organic solvent, or mixture thereof, as known to a person skilled in the art.

Example of organic solvents includes without limiation tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

The reaction temperature may vary depending upon the type of reaction. For example, for an amine-isocyanate or amine-acid chloride reaction, the temperature can be in the range of from −20 to 85° C., preferably from −10 to 50° C. and most preferably from −5 to 30° C. The times may vary within wide limits, a time of approximately from 1 to 10 hours, preferably from 2 to 8 hours and most preferably 2 to 3 hours having proved practicable.

The reaction times may vary within wide limits. One can monitor the reaction by monitoring the consumption of one or more functional groups participating in the reaction.

It is understood that some reactions are preferably carried out in the presence of a catalyst. For example, the hydroxyisocyanate reaction is advantageously carried out in the presence of a catalyst, since the reaction time can be significantly shortened. Suitable catalysts are for example metal salts such as alkali metal salts or tin salts of organic carboxylic acids, or tertiary amines, for example, $(C_1-C_6\text{-alkyl})_3N$ (triethylamine, tri-n-butylamine), N-methylpyrrolidine, N-methylmorpholine, N,N-dimethylpiperidine, pyridine or 1,4-diaza-bicyclooctane. Tin salts have proved to be particularly effective, especially alkyl-tin salts of carboxylic acids, for example dibutyl tin dilaurate (DBTDL) and tin dioctoate.

Alternatively, the intermediary copolymers with pendant or terminal functional groups can be prepared by actinically or thermally polymerizing a polymerizable mixture of components comprises components with one or more ethylenically unsaturated groups or thiol groups.

In a preferred embodiment, the intermediary copolymer with pendant or terminal functional groups is obtained by copolymerization of an actinically polymerizable composition comprising (1) at least one monoethylenically functionalized hydrophilic polymer (i.e., with one sole ethylenically unsaturated group), (2) at least one hydrophilic vinylic monomer (i.e., having one ethylenically unsaturated group), (3) at least one siloxane-containing monomer having one ethylenically unsaturated group, at least one siloxane-containing macromer having one ethylenically unsaturated group, at least one siloxane-containing monomer having two or more ethylenically unsaturated groups, at least one siloxane-containing macromer having two or more ethylenically unsaturated groups, or a combination of two or more thereof, (4) optionally at least one di- or multi-ethylenically functionalized hydrophilic polymer and/or at least one hydrophilic crosslinker (i.e., having two or more ethylenically unsaturated groups) with molecular weight less than 700 daltons; and (5) optionally at least one hydrophobic vinylic monomer, provided that at least one of components (2)-(4) further comprises at least one functional group through which an actinically crosslinkable group (ethylenically unsaturated group or thiol group) can be covalently linked to the obtained copolymer.

In another preferred embodiment, the intermediary copolymer with pendant or terminal functional groups is obtained by copolymerization of a composition comprising (1) at least one monoethylenically functionalized hydrophilic polymer (i.e., with one sole ethylenically unsaturated group), (2) at least one hydrophilic vinylic monomer (i.e., having one ethylenically unsaturated group), (3) at least one siloxane-containing monomer having one ethylenically unsaturated group, at least one siloxane-containing macromer having one ethylenically unsaturated group, at least one siloxane-containing monomer having two or more ethylenically unsaturated groups, at least one siloxane-containing macromer having two or more ethylenically unsaturated groups, or a combination of two or more thereof, (4) optionally at least one di- or multi-ethylenically functionalized hydrophilic polymer and/or at least one hydrophilic crosslinker (i.e., having two or more ethylenically unsaturated groups) with molecular weight less than 700 daltons; (5) optionally at least one hydrophobic vinylic monomer, and (6) at least one chain transfer agent having a functional group through which an actinically crosslinkable group (ethylenically unsaturated group or thiol group) can be covalently linked to the obtained copolymer.

In accordance with the invention, the mono-, di- or multi-ethylenically functionalized hydrophilic polymers can be prepared by covalently attaching one or more ethylenically unsaturated groups to the functional groups (e.g., amine, hydroxyl, carboxyl, isocyanate, epoxy groups) of a mono-, di- or multi-functionalized hydrophilic precursor polymer or copolymers (i.e., with one or more functional groups). Any vinylic monomer having a hydroxy, amino, carboxyl, epoxy, acid-chloride, isocyanate group, which is coreactive with isocyanate, amine, hydroxyl, carboxy, or epoxy groups of a polymer or copolymer in the absence or presence of a coupling agent (such as, e.g., EDC, diisocyanate, or diacid chloride), can be used in ethylenically functionalizing the precursor polymer or copolymer. Examples of such vinylic monomers include, without limitation, for reacting with terminal hydroxy groups, 2-isocyanatoethyl methacrylate, methacrylic anhydride, 3-isopropenyl-alpha, alpha-dimethylbenzyl isocyanate, acryloyl chloride, or methacryloyl chloride, glycidyl methacrylate; for reacting with terminal amine groups, 2-isocyanatoethyl methacrylate, 3-isopropenyl-alpha, alpha-dimethylbenzyl isocyanate, methacrylic anhydride, acrylic acid, methacrylic acid, acryloyl chloride, or methacryloyl chloride; for reacting with terminal carboxy groups in the presence of EDC, vinylamine, 2-aminoethyl methacrylate or 3-aminopropyl methacrylamide. The above list is not exhaustive but illustrative. A person skilled in the art will know how to select a vinylic monomer with a functional group to functionalize ethylenically hydrophilic precursor polymers or copolymers.

Examples of mono-, di- or multi-ethylenically functionalized hydrophilic polymers includes without limitation hydrophilic polymers or copolymers having one terminal acryloyl

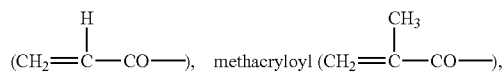

or vinyl group; hydrophilic polymers or copolymers with two terminal acryloyl, methacryloyl, or vinyl groups; and hydrophilic polymers or copolymers with multiple (i.e., 3 or more) acryloyl, methacryloyl, or vinyl groups. The hydrophilic polymers or copolymers are preferably selected from the group consisting of: PEGs; PEG/PPG block copolymers; polyalkylacrylamides; poyalkylmethacrylamides; polyvinylpyrrolidones; copolymers of N-vinylpyrrolidone with dialkylaminoalkylacrylate (e.g., dimethylaminoethylacrylate), dialkylaminoalkylmethacrylate (e.g., dimethylaminoethylmethacrylate), N,N-dialkylacrylamide, N,N-dialkylmethacrylamide, vinylacetate, or mixture thereof; polyvinylalcohols (derived from polyvinylacetates); copoymers of vinylacetate with dialkylaminoalkylacrylate (e.g., dimethylaminoethylacrylate), dialkylaminoalkylmethacrylate (e.g., dimethylaminoethylmethacrylate), N,N-dialkylacrylamide, N,N-dialkylmethacrylamide, vinylacetate, or mixture thereof.

Mono-ethylenically functionalized PEGs or block PEG/PPG copolymers and di-ethylenically functionalized PEGs or block PEG/PPG copolymers either are commercially available or can be prepared by covalently attaching acryloyl, methacryloyl or vinyl groups to monofunctional group terminated PEGs or block copolymers of ethylene oxide and propylene oxide and difunctional group terminated PEGs or block copolymers of ethylene oxide and propylene oxide.

A "monoethylenically functionalized" polymer or copolymer means that the polymer or copolymer has one single ethylencially unsaturated group. A "diethylenically functionalized" polyer or copolymer means that the polymer or copolymer has only two ethylencially unsaturated groups.

Mono- or di-ethylenically functionalized polyalkylacrylamides, poyalkylmethacrylamides, polyvinylpyrrolidones; copolymers of N-vinylpyrrolidone with one or more vinylic monomers, polyvinylalcohols (derived from polyvinylacetates), or copoymers of vinylacetate with one or more vinylic monomers can be prepared from their corresponding monofunctional group terminated precursor polymers or copolymers described above.

Where mono- or di-functional group terminated hydrophilic precursor polymers or copolymers are polyvinyl alcohols or polyvinylalcohol copolymers, the terminal functional groups preferably are amine or carboxyl groups. In general, isocyanate groups would first react with amine groups even in the presence of hydroxyl groups. Also, amine groups or carboxy groups will participate in EDC mediated coupling reaction whereas hydroxyl groups will not.

In accordance with the invention, multiethylencially functionalized hydrophilic polymers are derived from hydrophilic precursor polymers or copolymers containing multiple pendant and/or terminal functional groups (e.g., —NH$_2$, —COOH, —OH). Examples of such hydrophilic precursor copolymers are the copolymers of N-vinylpyrrolidone, N,N-dialkylacrylamide, N,N-dialkylmethacrylamide, dialkylaminoalkylmethacrylate, or dialkylaminoalkylacrylate with at least one functional group-containing vinylic monomer selected from the group consisting of vinylacetate, acrylic acid, methacrylic acid, hydroxylalkylacrylate, hydroxymethacylate, aminoalkyacrylate, and aminoalkymethacrylate. The percentage of units derived from functional group-containing vinylic monomer is preferably less than about 15%, more preferably less than about 10%, even more preferably less than about 5% by weight.

In accordance with the invention, the monoethylenically functionalized hydrophilic polymer has a molecular weight of from about 500 to about 20,000, preferably from about 1000 to about 10,000, more preferably from about 2000 to about 6000 Daltons.

It is understood that a mixture of one or more monoethylenically functionalized hydrophilic polymers and one or more diethylenically functionalized hydrophilic polymers can be advantageously used in preparing the intermediary copolymer, the precursor of a prepolymer of the invention.

Nearly any hydrophilic vinylic monomer can be used in the actinically polymerizable composition for preparing the intermediary copolymer with pendant or terminal functional groups. Suitable hydrophilic vinylic monomers are, without this being an exhaustive list, hydroxyl-substituted hydroxyl-substituted $C_1$-$C_8$ alkylacrylates and methacrylates, acrylamide, methacrylamide, $C_1$-$C_8$ alkylacrylamides, $C_1$-$C_8$ alkylmethacrylamides, ethoxylated acrylates, ethoxylated methacrylates, hydroxyl-substituted $C_1$-$C_8$ alkylacrylamides, hydroxyl-substituted $C_1$-$C_8$ alkylmethacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2-and 4-vinylpyridine, vinylically unsaturated carboxylic acids having a total of 3 to 5 carbon atoms, amino(lower alkyl)-(where the term "amino" also includes quaternary ammonium), mono(lower alkylamino)(lower alkyl) and di(lower alkylamino)(lower alkyl)acrylates and methacrylates, allyl alcohol, N-vinyl alkylamide, N-vinyl-N-alkylamide, and the like.

Among the preferred hydrophilic vinylic monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, Aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, and N-vinyl caprolactam.

Nearly any hydrophobic vinylic monomer can be used in the actinically polymerizable composition for preparing the intermediary copolymer with pendant or terminal functional groups. Suitable hydrophobic vinylic monomers include, without limitation, $C_1$-$C_{18}$-alkylacrylates and -methacrylates, $C_3$-$C_{18}$ alkylacrylamides and -methacrylamides, acrylonitrile, methacrylonitrile, vinyl-$C_1$-$C_{18}$-alkanoates, $C_2$-$C_{18}$-alkenes, $C_2$-$C_{18}$-halo-alkenes, styrene, $C_1$-$C_6$-alkylstyrene, vinylalkylethers in which the alkyl moiety has 1 to 6 carbon atoms, $C_2$-$C_{10}$-perfluoralkyl-acrylates and -methacrylates or correspondingly partially fluorinated acrylates and methacrylates, $C_3$-$C_{12}$-perfluoralkyl-ethyl-thiocarbonylaminoethyl-acrylates and -methacrylates, acryloxy and methacryloxy-alkylsiloxanes, N-vinylcarbazole, $C_1$-$C_{12}$-alkylesters of maleic acid, fumaric acid, itaconic acid, mesaconic acid and the like. Preference is given e.g. to $C_1$-$C_4$-alkylesters of vinylically unsaturated carboxylic acids with 3 to 5 carbon atoms or vinylesters of carboxylic acids with up to 5 carbon atoms.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonylaminoethyl-methacrylate, isobornyl methacrylate, trifluoroethyl methacrylate, hexafluoro-isopropyl methacrylate, hexafluorobutyl methacrylate, tris-trimethylsilyloxy-silylpropyl methacrylate, 3-methacryloxypropyl-pentamethyl-disiloxane and bis(methacryloxypropyl)-tetramethyl-disiloxane.

Any known suitable siloxane-containing monomers or macromers with one or more ethylenically unsaturated groups can be used in the actinically polymerizable composition for preparing the intermediary copolymer with pendant or terminal functional groups. Preferred examples of such monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); dimethacrylated or diacrylated polydimethylsiloxanes of various molecular weight; vinyl terminated polydimethylsiloxanes; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alphaomega-bis-3-aminopropyl-polydimethylsiloxane; polysiloxanylalkyl (meth) acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing monomers or macromers; siloxane-containing macromers disclosed in U.S. Pat. No. 6,762,264 (here incorporated by reference in its entirety). Di and triblock macromers consisting of polydimethylsiloxane and polyakyleneoxides could also be of utility. For example one might use methacrylate end capped polyethyleneoxide-block-polydimethylsiloxane-block-polyethyleneoxide to enhance oxygen permeability. Suitable monofunctional hydroxyl-functionalized siloxane-containing monomers and suitable multifunctional hydroxyl-functionalized siloxane-containing monomers are commercially available from Gelest, Inc, Morrisville, Pa.

The functional chain transfer agent is used to control the molecular weight of the resulting copolymer and to provide functionality for subsequent addition of a thiol group, an ene-containing group, a cinnamic acid moiety, a dialkylmaleimide group. The chain transfer agent may comprise one or more thiol groups, for example two or most preferably one thiol group. Suitable chain transfer agents include organic primary thiols or mercaptans having a further functional group such as, for example, hydroxy, amino, carboxy or a suitable derivative thereof. The chain transfer agent may be present in the polymerizable composition for making an intermediary copolymer in an amount of, for example, from about 0.5 to about 5%, preferably from about 1% to about 4%, and in particular from about 1.5% to about 3.5% by weight, relative to the combined weight of all of polymerizable components.

Any know suitable vinylic monomer containing at least one functional group can be used in the actinically polymerizable composition for preparing the intermediary copolymer with pendant or terminal functional groups. Preferred examples of such vinylic monomers includes methacrylic acid (MAA), acrylic acid, glycidylmethacrylate, glycidylacrylate, HEMA, HEA, methacrylic anhydride, N-hydroxymethylacrylamide (NHMA), 2-bromoethylmethacrylate, and vinylbenzylchloride.

It should be understood that a vinylic monomer can be used both as a hydrophilic vinylic monomer and as a functionalizing vinylic monomer in the actinically polymerizable composition for preparing the silicone-containing polymer with pendant or terminal functional groups. Preferably, the hydrophilic vinylic monomer is devoid of functional groups (e.g., DMA, NVP).

The actinically polymerizable composition for preparing an intermediary copolymer can be a melt, a solventless liquid in which all necessary components are blended together preferably in the presence of one or more blending vinylic monomers, or a solution in which all necessary component is dissolved in an inert solvent (i.e., should not interfer with the reaction between the reactants in the mixture), such as water, an organic solvent, or mixture thereof, as known to a person skilled in the art. Examples of solvents are described above.

The one or more blending vinylic monomers are in an amount sufficient to dissolve both hydrophilic and hydrophobic components of the actinically polymerizable composition. A "blending vinylic monomer" refers to a vinylic monomer which can function both as a solvent to dissolve both hydrophilic and hydrophobic components of an actinically polymerizable composition and as one of polymerizable components to be polymerized to form a silicone hydrogel material. Preferably, the blending vinylic monomer is present in the actinically polymerizable composition in an amount of from about 5% to about 30% by weight.

Any suitable vinylic monomers, capable of dissolving both hydrophilic and hydrophobic components of a polymerizable composition of the invention to form a solution, can be used in the invention. Preferred examples of blending vinylic monomers include, without limitation, aromatic vinylic monomers, cycloalkyl-containing vinylic monomers. Those preferred blending monomers can increase the predominant glass transition temperature of a silicone hydrogel material prepared by curing a polymerizable composition containing those preferred blending monomer.

Examples of preferred aromatic vinylic monomers include styrene, 2,4,6-trimethylstyrene (TMS), t-butyl styrene (TBS), 2,3,4,5,6-pentafluorostyrene, benzylmethacrylate, divinylbenzene, and 2-vinylnaphthalene. Of these monomers, a styrene-containing monomer is preferred. A styrene-containing monomer is defined herein to be a monomer that contains a vinyl group bonded directly to a phenyl group in which the phenyl group can be substituted by other than a fused ring, e.g., as above with one to three $C_1$-$C_6$ alkyl groups. Styrene itself [$H_2C=CH-C_6H_5$] is a particularly preferred styrene-containing monomer.

A cycloalkyl-containing vinylic monomer is defined herein to be a vinylic monomer containing a cycloalkyl which can be substituted by up to three $C_1$-$C_6$ alkyl groups. Preferred cycloalkyl-containing vinylic monomers include, without limitation, acrylates and methacrylates each comprising a cyclopentyl or cyclohexyl or cycloheptyl, which can be substituted by up to 3 $C_1$-$C_6$ alkyl groups. Examples of preferred cycloalkyl-containing vinylic monomers include isobornylmethacrylate, isobornylacrylate, cyclohexylmethacrylate, cyclohexylacrylate, and the like.

The copolymerization of a polymerizable composition for preparing an intermediary copolymer may be induced photochemically or preferably thermally. Suitable thermal polymerization initiators are known to the skilled artisan and comprise, for example peroxides, hydroperoxides, azo-bis (alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis(isobutyronitrile) (AIBN), 1,1-azodiisobutyramidine, 1,1'-azo-bis(1-cyclohexanecarbonitrile), 2,2'-azo-bis(2,4-dimethylvaleronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere. Copolymerization can yield optical clear well-defined copolymers which may be worked up in conventional manner using for example extraction, precipitation, ultrafiltration and the like techniques.

Preferably, the polymerizable composition for preparing an intermediary copolymer comprises at least one silicone-containing vinylic monomer. Examples of preferred silicone-containing vinylic monomers (i.e., with one sole ethylenically unsaturated group) include 3-methacryloxy propylpentamethyldisiloxane, bis(methacryloxypropyl)tetramethyl-disiloxane, N-[tris(trimethylsiloxy)silylpropyl] acrylamide, N-[tris(trimethylsiloxy)silylpropyl]methacrylamide, and tristrimethylsilyloxysilylpropyl methacrylate (TRIS), N-[tris(trimethylsiloxy)silylpropyl]methacrylamide ("TSMAA"), N-[tris(trimethylsiloxy)silylpropyl]acrylamide ("TSAA"), (3-methacryloxy-2-hydroxypropyloxy)propylbis (trimethylsiloxy)methylsilane), (3-methacryloxy-2-hydroxypropyloxy)propyltris(trimethylsiloxy)silane, 3-methacryloxy-2-(2-hydroxyethoxy)-propyloxy) propylbis (trimethylsiloxy)methylsilane,N-2-methacryloxyethyl-O-(methyl-bis-trimethylsiloxy-3-propyl)silyl carbamate, silicone-containing vinyl carbonate or vinyl carbamate monomers (e.g., 1,3-bis[4-vinyloxycarbonyloxy)but-1-yl] tetramethyl-disiloxane; 3-(trimethylsilyl), propyl vinyl carbonate, 3-(vinyloxycarbonylthio)propyl-[tris(trimethyl-siloxy)silane], 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). A preferred silicone-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy)silane.

More preferably, an intermediary copolymer of the invention comprises: from about 15% to about 80% by weight, preferably from about 25% to about 70%, of siloxane units derived from one or more siloxane-containing monomers and/or one or more siloxane-containing macromers; from about 10% to about 80%, preferably from about 15% to 60% by weight, of hydrophilic units derived from one or more hydrophilic monomers and/or one or more hydrophilic macromers; from about 1% to about 30%, preferably from about 5% to about 25% of silicone-containing units derived from one or more silicone-containing vinylic monomers; and about 2% to about 30%, preferably from about 4% to about 20% by weight, of dangling hydrophilic polymer chains derived from one or more preformed hydrophilic polymers each having one sole ethylenically unsaturated group.

In accordance with the invention, ethylenically functionalizing of the intermediary copolymer can be carried out by covalently attaching ethylenically unsaturated groups to the functional groups (e.g., amine, hydroxyl, carboxyl, isocyanate, epoxy groups) of the intermediary copolymer. Any vinylic monomer having a hydroxy, amino, carboxyl, epoxy, acid-chloride, isocyanate group, which is coreactive with isocyanate, amine, hydroxyl, carboxy, or epoxy groups of an intermediary copolymer in the absence or presence of a coupling agent (such as, e.g., EDC, diisocyanate, or diacid chloride), can be used in ethylenically functionalizing the intermediary copolymer. Examples of such vinylic monomers include, without limitation, for reacting with terminal hydroxy groups, 2-isocyanatoethyl methacrylate, methacrylic anhydride, 3-isopropenyl-alpha, alpha-dimethylbenzyl isocyanate, acryloyl chloride, or methacryloyl chloride, glycidyl methacrylate; for reacting with terminal amine groups, 2-isocyanatoethyl methacrylate, 3-isopropenyl-alpha, alpha-dimethylbenzyl isocyanate, methacrylic anhydride, acrylic acid, methacrylic acid, acryloyl chloride, or methacryloyl chloride; for reacting with terminal carboxy groups in the presence of EDC, vinylamine, 2-aminoethyl methacrylate or 3-aminopropyl methacrylamide. The above list is not exhaustive but illustrative. A person skilled in the art will know how to select a vinylic monomer with a functional group to functionalize ethylenically intermediary copolymers.

A prepolymer of the invention is capable of forming, preferably in the absence of any hydrophilic vinylic monomer, a silicone hydrogel or contact lens, which has a high oxygen permeability (characterized by an apparent oxygen permeability of at least 40 barrers, preferably at least about 60 barrers, even more preferably at least 80 barrers) and a hydrophilic surface (characterized by having an averaged water contact angle of less than about 90 degrees or less, preferably about 80 degrees or less, more preferably about 70 degrees or less, even more preferably about 60 degrees or less). The silicone hydrogel material or contact lens preferably has a high ion permeability (characterized by an Ionoflux Diffusion Coefficient, D, of greater than about $1.5 \times 10^{-6}$ mm$^2$/min, preferably greater than about $2.6 \times 10^{-6}$ mm$^2$/min, more preferably greater than about $6.4 \times 10^{-6}$ mm$^2$/min). The silicone hydrogel material or contact lens preferably has an elastic modulus of about 2.0 MPa or less, preferably about 1.5 MPa or less, more preferably about 1.2 or less, even more preferably from about 0.4 MPa to about 1.0 MPa. The silicone hydrogel material or contact lens preferably has a water content of preferably from about 18% to about 55%, more preferably from about 20% to about 38% by weight when fully hydrated. The water content of a silicone hydrogel contact lens can be measured according to Bulk Technique as disclosed in U.S. Pat. No. 5,849,811.

Preferably, the prepolymers used in the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner. Thus, after polymerization, the device will not require subsequent purification such as, for example, costly and complicated extraction of unpolymerized matrix-forming material. Furthermore, crosslinking of the prepolymer can take place absent a solvent or in aqueous solution so that a subsequent solvent exchange or the hydration step is not necessary.

In another aspect, the invention provides a soft contact lens. The soft contact lens of the invention comprises: a silicone hydrogel material that is obtained by curing a lens-forming material in a mold, wherein the lens-forming material comprises an actinically crosslinkable or polymerizable prepolymer, wherein the prepolymer comprises (1) siloxane units derived from one or more siloxane-containing monomers and/or one or more siloxane-containing macromers; (2) hydrophilic units derived from one or more hydrophilic monomers and/or one or more hydrophilic macromers; and (3) dangling hydrophilic polymer chains that are covalently attached to the copolymer chain and derived from one or more pre-formed hydrophilic polymers each having one sole crosslinkable group, wherein the dangling hydrophilic chains are free of actinically-crosslinkable groups, wherein the pre-formed hydrophilic polymer has a molecular weight sufficient low to be efficiently and covalently incorporated in the prepolymer but sufficient high to provide the soft contact lens with a water contact angle of about 90 degrees or less without post-curing surface treatment and when being present in the prepolymer in an amount of from about 2% to about 30% by weight.

In accordance with the invention, a lens-forming material is a composition which can be a solution or a melt at a temperature from about 20° C. to about 85° C. Preferably, a lens-forming material is a solution of at least one prepolymer of the invention and other desirable components in water, or an organic solvent, or a mixture of water and one or more organic solvents.

A solution of at least one prepolymer can be prepared by dissolving the prepolymer and other components in any suitable solvent known to a person skilled in the art. Examples of suitable solvents are described above.

All of the various embodiments of the prepolymer of the invention described above can be used in this aspect of the invention.

The lens-forming material can optionally but preferably does not comprise one or more vinylic monomer and/or one or more crosslinking agents (i.e., compounds with two or more ethylenically unsaturated groups and with molecular weight less than 700 Daltons). However, the amount of those components should be low such that the final ophthalmic device does not contain unacceptable levels of unpolymerized monomers and/or crosslinking agents. The presence of unacceptable levels of unpolymerized monomers and/or crosslinking agents will require extraction to remove them, which requires additional steps that are costly and inefficient. But preferably, the lens-forming material is substantially free of vinylic monomer and crosslinking agent (i.e., preferably about 2% or less, more preferably about 1% or less, even more preferably about 0.5% or less by weight of combination of vinylic monomer and crosslinking agent).

It must be understood that a lens-forming material can also comprise various components, such as, for example, polymerization initiators (e.g., photoinitiator or thermal initiator), a visibility tinting agent (e.g., dyes, pigments, or mixtures thereof, UV-blocking (absorbing) agent, photosensitizers, inhibitors, antimicrobial agents (e.g., preferably silver nanoparticles or stabilized silver nanoparticles), bioactive agent, leachable lubricants, fillers, and the like, as known to a person skilled in the art.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is azobisisobutyronite (AIBN).

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials and non-crossilinkable hydrophilic polymers (i.e., without ethylenically unsaturated groups). Exemplary mucin-like materials include without limitation polyglycolic acid, polylactides, collagen, hyaluronic acid, and gelatin.

Any hydrophilic polymers or copolymers without any ethylenically unsaturated groups can be used as leachable lubricants. Preferred examples of non-crossllinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N-N-dimethylacrylamide, polyacrylic acid, poly 2 ethyl oxazoline, heparin polysaccharides, polysaccharides, and mixtures thereof.

The molecular weight of the non-crosslinkable hydrophilic polymer is preferably from about 20,000 to about 1,500,000 daltons, more preferably from about 50,000 to 1,200,000 daltons, even more preferably from 100,000 to 1,000,000 daltons.

In accordance with the invention, the lens-forming material can be introduced (dispensed) into a cavity formed by a mold according to any known methods.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for preparing ocular lenses. For example, polymeric materials, such as polyethylene, polypropylene, polystyrene, PMMA, cyclic olefin copolymers (e.g., Topas® COC from Ticona GmbH of Frankfurt, Germany and Summit, N.J.; Zeonex® and Zeonor® from Zeon Chemicals LP, Louisville, Ky.), or the like can be used. Other materials that allow UV light transmission could be used, such as quartz, glass, $CaF_2$, and sapphire.

In a preferred embodiment, when the polymerizable components in the lens-forming material is composed essentially of prepolymers, reusable molds can be used. Examples of reusable molds made of quartz or glass are those disclosed in U.S. Pat. No. 6,627,124, which is incorporated by reference in their entireties. In this aspect, the lens-forming material is poured into a mold consisting of two mold halves, the two mold halves not touching each other but having a thin gap of annular design arranged between them. The gap is connected to the mold cavity, so that excess lens-forming material can flow into the gap. Instead of polypropylene molds that can be used only once, it is possible for reusable quartz, glass, sapphire molds to be used, since, following the production of a lens, these molds can be cleaned rapidly and effectively to remove unreacted materials and other residues, using water or a suitable solvent, and can be dried with air. Reusable molds can also be made of a cyclic olefin copolymer, such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced and high fidelity to the lens design.

After the lens-forming material is dispensed into the mold, it is polymerized to produce a contact lens. Crosslinking may be initiated in the mold e.g. by means of actinic radiation, such as UV irradiation, ionizing radiation (e.g., gamma or X-ray irradiation). Where prepolymers of the invention are the polymerizable components in the lens-forming material, the mold containing the lens-forming material can be exposed to a spatial limitation of actinic radiation to crosslink the prepolymers.

The crosslinking according to the invention may be effected in a very short time, e.g. in $\leq 60$ minutes, advantageously in $\leq 20$ minutes, preferably in $\leq 10$ minutes, most preferably in $\leq 5$ minutes, particularly preferably in 1 to 60 seconds and most particularly in 1 to 30 seconds.

The contact lenses according to the invention can be produced from one or more radiation-curable prepolymers of the invention in a very simple and efficient way compared with the prior art. This is based on many factors. On the one hand, the starting materials may be acquired or produced inexpensively. Secondly, there is the advantage that the prepolymers are surprisingly stable, so that they may undergo a high degree of purification. There is no practical need for subsequent purification, such as in particular complicated extraction of unpolymerized constituents after curing lenses. Furthermore, the new polymerization method can be used to produce contact lenses with desirable mechanical and physical properties. Finally, photo-polymerization is effected within a short period, so that from this point of view also the production process for the contact lenses according to the invention may be set up in an extremely economic way.

Opening of the mold so that the molded article can be removed from the mold may take place in a manner known per se.

If the molded contact lens is produced solvent-free from an already purified prepolymer according to the invention, then after removal of the molded lens, it is not normally necessary to follow up with purification steps such as extraction. This is because the prepolymers employed do not contain any undesired constituents of low molecular weight; consequently, the crosslinked product is also free or substantially free from such constituents and subsequent extraction can be dispensed with. Accordingly, the contact lens can be directly transformed in the usual way, by hydration, into a ready-to-use contact lens. Appropriate embodiments of hydration are known to the person skilled in the art, whereby ready-to-use contact lenses with very varied water content may be obtained. The contact lens is expanded, for example, in water, in an aqueous salt solution, especially an aqueous salt solution having an osmolarity of about 200 to 450 milli-osmole in 1000 ml (unit: mOsm/ml), preferably about 250 to 350 mOsm/l and especially about 300 mOsm/l, or in a mixture of water or an aqueous salt solution with a physiologically compatible polar organic solvent, e.g. glycerol. Preference is given to expansions of the article in water or in aqueous salt solutions.

If the molded contact lens is produced from an aqueous solution of an already purified prepolymer according to the invention, then the crosslinked product also does not contain any troublesome impurities. It is therefore not necessary to carry out subsequent extraction. Since crosslinking is carried out in an essentially aqueous solution, it is additionally unnecessary to carry out subsequent hydration. The contact lenses obtained by this process are therefore notable, according to an advantageous embodiment, for the fact that they are suitable for their intended usage without extraction. By intended usage is understood, in this context, that the contact lenses can be used in the human eye.

Similarly, if the molded contact lens is produced from a solvent solution of an already purified prepolymer according to the invention, it is not necessary to carry out subsequent extraction, but instead of hydration process to replace the solvent.

The molded contact lenses can further subject to further processes, such as, for example, surface treatment, sterilization, and the like.

A contact lens of the invention has an oxygen permeability of preferably at least about 40 barrers, more preferably at least about 60 barrers, even more preferably at least about 80 barrers. In accordance with the invention, an oxygen permeability is an apparent (directly measured when testing a sample with a thickness of about 100 microns) oxygen permeability according to procedures described in Examples.

A contact lens of the invention has an elastic modulus of about 2.0 MPa or less, preferably about 1.5 MPa or less, more preferably about 1.2 or less, even more preferably from about 0.4 MPa to about 1.0 MPa.

A contact lens of the invention further has an Ionoflux Diffusion Coefficient, D, of, preferably at least about $1.5 \times 10^{-6}$ mm$^2$/min, more preferably at least about $2.6 \times 10^{-6}$ mm$^2$/m even more preferably at least about $6.4 \times 10^{-6}$ mm$^2$/min.

A contact lens of the invention further has a water content of preferably from about 15% to about 55%, more preferably from about 20% to about 38% by weight when fully hydrated. The water content of a silicone hydrogel contact lens can be measured according to Bulk Technique as disclosed in U.S. Pat. No. 5,849,811.

A contact lens of the invention has a surface hydrophilicity characterized by having an averaged water contact angle of about 90 degrees or less, preferably about 80 degrees or less, more preferably about 70 degrees or less, more preferably about 60 degrees or less.

In a further aspect, the invention provides a method for producing soft contact lenses. The method comprises the steps of: comprising the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises one or more actinically crosslinkable prepolymers and is substantially free of vinylic monomer and/or crosslinking agent, wherein each of said one or more prepolymers comprises (1) siloxane units derived from one or more siloxane-containing monomers and/or one or more siloxane-containing macromers; (2) hydrophilic units derived from one or more hydrophilic monomers and/or one or more hydrophilic macromers; and (3) dangling hydrophilic polymer chains that are covalently attached to the copolymer chain and derived from one or more pre-formed hydrophilic polymers each having one sole crosslinkable group, wherein the dangling hydrophilic chains are free of actinically-crosslinkable groups, wherein the pre-formed hydrophilic polymer has a molecular weight sufficient low to be efficiently and covalently incorporated in the prepolymer but sufficient high to provide the soft contact lens with a water contact angle of about 90 degrees or less without post-curing surface treatment when being present in the prepolymer in an amount of from about 2% to about 30% by weight; and actinically irradiating the composition in the mold to crosslink said one or more crosslinkable prepolymers to form the contact lens.

All of the various embodiments of the prepolymer and contact lens of the invention described above can be used in this aspect of the invention.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

Surface Hydrophilicity (Wetability) Tests

Water contact angle on a contact lens is a general measure of the surface hydrophilicity (or wetability) of the contact lens. In particular, a low water contact angle corresponds to more hydrophilic surface. Average contact angles (advancing) of contact lenses are measured using Wilhelmy Plate method.

Coating Intactness Tests

The intactness of a coating on the surface of a contact lens can be tested according to Sudan Black stain test as follow. Contact lenses with a coating (e.g., an LbL coating, a plasma coating, or any other coatings) are dipped into a Sudan Black dye solution (Sudan Black in vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated.

Coating Durability Tests

The lenses are digitally rubbed 30 times with Aquify® multi-purpose lens care solution and then rinsed with Softwear® saline. The digitally rubbed lenses are then soaked in Softwear® saline for 30 minutes. The above procedure is repeated for a given times, e.g., from 1 to 30 times, (i.e., number of consecutive digital rubbing tests which imitate cleaning and soaking cycles). The lenses are then subjected to Sudan Black test (i.e., coating intactness test described above) to examine whether the coating is still intact. To survive digital rubbing test, there is no significantly increased staining spots (e.g., staining spots covering no more than about 5% of the total lens surface).

Oxygen permeability measurements. The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters $O_2/cm^2$–minute]
$P_{oxygen} = (P_{measured} - P_{water\ vapor}) = (\% O_2$ in air stream) [mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
where $Dk_{app}$ is expressed in units of barrers. The oxygen transmissibility (Dk/t) of the material may be calculated by dividing the oxygen permeability ($Dk_{app}$) by the average thickness (t) of the lens.

Ion Permeability Measurements. The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.

EXAMPLE 2A

Synthesis of Intermediary Copolymer
(YS-3203-028-1)

A mixture of 60.0 g of αω-bisacrylamide-polydimethylsiloxane$_{M.W.=11,500}$, and 241.6 grams of 1-propanol is added to a 2-L heating/cooling jacked reaction vessel equipped with mechanical stirrer, condenser, vacuum/N$_2$ connection, thermostat. The solution is chilled to 8° C. and degassed for 3 cycles of evacuation to 15 mbar for 15 minutes and flushed with N$_2$. The system is controlled under nitrogen environment until the end of reaction. The monomer solution which contains 25.83 g of N,N,-dimethyl acrylamide, 11.07 g of PEG-Acrylate (MM=454), 1.05 g of cysteamine hydrochloride and 140 g of 1-propanol is slowly added to the reaction vessel by a LC pump connected with a degas unit. The adding rate of the monomer solution is controlled at ≅3.0 mL/minute. After all of the monomer solution is added, the mixture is slowly heated from 8° C. to 68° C. over an one hour time period. When the polymerization temperature reaches 68° C., the initiator solution which composed of 0.1 g of AIBN and 40.0 g of 1-propanol (Degassed for 3 cycles of evacuation to 80 mBar for 5 minutes and flushed with N$_2$), is injected to the reaction mixture. The feed solution which contains 1.95 g of cysteamine hydrochloride and 198.4 g of 1-propanol is added into the reaction mixture over 2 hours through a LC pump connected with a degas unit. The adding rate of this feed solution is controlled at ≅2.25 mL/minute. After all of the feed solution is added, the polymerization is performed at 68° C. for another 6 hours.

After reaction mixture is cooled to room temperature, reaction solvent, 1-propanol, is gradually replaced by DI water on rotavap until the mixture becomes an aqueous emulsion. The emulsion is purified by ultrafiltration using a membrane with 10 KD molecular weight cut off. The intermediary copolymer yield is 70%.

EXAMPLE 2B

Synthesis of Prepolymer

The purified emulsion solution from Example 2A is diluted to ≅2 L and then charged to a 2-L heating/cooling jacked reaction vessel equipped with mechanical stirrer and thermometer. A buffer salt, 4.0 g of $NaHCO_3$, is added and then mixture is cooled to 0° C. The solution pH is adjusted to 9.5 with 20% $NaOH_{(aq)}$ and then start adding 5.8 mL acryloyl chloride over 2 hour followed by another hour of agitation. The solution pH is controlled at 9.5 during the acrylation by a static pH control equipment with 20% $NaOH_{(aq)}$. After the reaction is completed, the solution pH is adjusted to 7.0 with 2N $HCl_{(aq)}$ and then purified by ultrafiltration using a membrane with 10 KD molecular weight cut off. The purified emulsion is freeze dried and yield a while solid.

EXAMPLE 2C

Formulation and Lens Fabrication

The prepolymer obtained from Example 2B is dissolved in a solvent, 1-propanol. The solution is pressure filtered through a 0.45 μm filter followed by the first stage of concentration to about 30% solid. After the precise solid content is verified, 0.25 weight percent of Darocur® 2959 (based upon macromonomer content) is added followed by further concentration until the final percentage of solid is 60%. The formula viscosity and curing time is measure by photorheology The formula is centrifuged at 5000 rpm for 10 minutes to remove air bubbles.

The formula is cast in polypropylene molds and cured by UV light at intensity 2.05 $mW/cm^2$ at 310 nm with the curing time providing equivalent total energy obtained from the measurement of photorheology.

EXAMPLE 3A

Synthesis of Intermediary Copolymer (YS-3203-028-2)

The intermediary copolymer is prepared by the same manner as Example 2A, except that 1) the monomer solution is composed of 26.215 g of N,N,-dimethyl acrylamide, 11.24 g of PEG-Acrylate (MM=454), 0.84 g of cysteamine hydrochloride, 2) the initiator solution is composed of 0.15 g of AIBN and 40.0 g of 1-propanol, and 3) the feeding solution is composed of 1.56 g of cysteamine hydrochloride and 198.4 g of 1-propanol. The copolymer yield is 60%.

EXAMPLE 3B

Synthesis of Prepolymer

The acrylation of the intermediary copolymer prepared in Example 3A is performed according to the procedure described in Example 2B except that 4.7 mL of acryloyl chloride is used. After the emulsion solution is purified and freeze dried, the final product is white solid.

EXAMPLE 3C

Formulation and Lens Fabrication

The prepolymer obtained from Example 3B is formulated and then lenses are produced according to the procedure described in Example 2C.

EXAMPLE 4

The lenses prepared in Examples 2C and 3C are dipped in a PAA (polyacrylic acid) solution. All lenses after being treated with PAA solution are transparent and show desired mechanical property, ion permeability and oxygen permeability (See lens properties in Table 1, suitable methods for determination of ion permeability and oxygen permeability are described in Example 1.

| | Lens Characterization. | | |
|---|---|---|---|
| | Lot # | Example 2C | Example 3C |
| Properties | E Modulus, MPa | 0.73 | 0.66 |
| | EtB % | 285% | 295% |
| | $H_2O$ % | 17.1% | 22.4% |
| | Dk | 106 | 178 |
| | IP | 1.6 | 5.7 |

What is claimed is:
1. An actinically crosslinkable prepolymer, comprises:
 (1) siloxane units derived from one or more siloxane-containing compounds each with two terminal first or second functional groups; and
 (2) hydrophilic units derived from one or more preformed linear hydrophilic monomers or polymers, wherein each hydrophilic monomer or polymer has two terminal first or second functional groups; and
 (3) from about 2% to about 30% by weight of dangling hydrophilic polymer chains that are derived from one or more pre-formed hydrophilic polymers each having one sole first or second functional group and are free of actinically-crosslinkable groups, wherein the preformed hydrophilic polymer has a molecular weight of from 2000 to about 6000 Daltons and sufficient low to be efficiently and covalently incorporated in the prepolymer but sufficient high to provide a silicone hydrogel contact lens having a water contact angle of about 90 degrees or less without post-curing surface treatment,
 wherein the prepolymer is obtained from an intermediary copolymer with pendant or terminal functional groups and dangling hydrophilic polymer chains by covalently attaching actinically crosslinkable groups to the intermediary copolymer through the pendant or terminal functional groups, wherein the pendant or terminal functional groups are selected from the group consisting of hydroxy groups, amino groups, (—$NH_2$),carboxyl groups (—COOH ) epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or I), acid anhydride groups, and combinations thereof, wherein the intermediary copolymer is obtained by copolymerization of a mixture comprising (a) the one or more linear siloxane-containing compound each with two terminal first or second functional groups, (b) the one or more linear hydrophilic monomers or polymers each with two terminal first or second functional groups, (c) the one or more hydrophilic polymers each with only one first or second functional group, and (d) one or more branching agents which independently of each other are an organic compound with three or more first or second functional groups, wherein the first and second functional groups are different from each other and selected from the group consisting of amine group, hydroxyl, carboxy, isocyanate, epoxy, and acid halide group, wherein the first and second functional groups are different from each other but coreactive with each other in the presence or absence of a coupling agent to form a covalent linkage selected from the group consisting of urethane, urea, ether, and amide, wherein the ratio of molar equivalents of the first functional groups to the second functional groups or of the second functional groups to the first functional groups in the mixture is from about 1.1 to about 20, wherein the prepolymer is capable of being actinically crosslinked, in the absence of one or more monomers, to form the silicone hydrogel contact lens.

2. The prepolymer of claim 1, wherein the prepolymer comprises multiple actinically crosslinkable groups selected from the group consisting of ene-containing groups, ethylenically unsaturated groups, and thiol groups, wherein the ene-containing groups is defined by any one of formula (I)-(III)

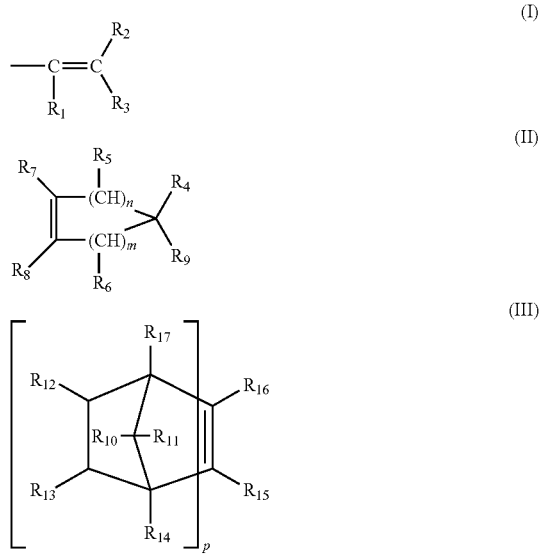

in which $R_1$ is hydrogen, or $C_1$-$C_{10}$ alkyl; $R_2$ and $R_3$ independent of each other are hydrogen, $C_1$-$C_{10}$ alkene divalent radical, $C_1$-$C_{10}$ alkyl, or —$(R_{18})_a$—$(X_1)_b$—$R_{19}$ in which $R_{18}$ is $C_1$-$C_{10}$ alkene divalent radical, $X_1$ is an ether linkage (—O—), a urethane linkage, a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a and b independent of each other is zero or 1, provided that only one of $R_2$ and $R_3$ is a divalent radical; $R_4$—$R_9$, independent of each other, are hydrogen, $C_1$-$C_{10}$ alkene divalent radical, $C_1$-$C_{10}$ alkyl, or —$(R_{18})_a$—$(X_1)_b$—$R_{19}$, optionally $R_4$ and $R_9$ are linked through an alkene divalent radical to form a cyclic ring, provided that at least one of $R_4$ -$R_9$ are divalent radicals; n and m independent of each other are integer number from 0 to 9, provided that the sum of n and m is an integer number from 2 to 9; $R_{10}$ -$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{19}$, p is an integer number from 1 to 3, provided that only one or two of $R_{10}$ -$R_{17}$ are divalent radicals.

3. The prepolymer of claim 2, wherein the prepolymer comprises from about 15% to about 80% by weight of the siloxane units derived from the one or more siloxane-containing monomers and/or the one or more siloxane-containing macromers; from about 10% to about 80% of the hydrophilic units derived from one or more hydrophilic monomers and/or the one or more hydrophilic macromers; and about 2% to about 30% of dangling hydrophilic polymer chains derived from the one or more pre-formed hydrophilic polymers each having one sole crosslinkable group.

4. The prepolymer of claim 1, wherein the at least one linear siloxane-containing compound are difunctional group-terminated polysiloxane selected from the group consisting of poly(dialkylsiloxane), poly(diarylsiloxane), polyarylalkylsiloxane, copolymers of different dialkysiloxanes, copymers of dialkylsiloxane with diarylsiloxane or arylalkylsiloxane, and combinations thereof.

5. The prepolymer of claim 1, wherein the at least one linear hydrophilic monomer or polymer with two terminal first or second functional groups is difunctional group-terminated poly(ethylene glycol) (PEG), difunctional group-terminated block copolymers of ethylene oxide and propylene oxide, difunctional group-terminated polymers polyalkylacrylamides, difunctional group-terminated polyalkylmethacrylamides, difunctional group-terminated polyvinylpyrrolidones, difunctional group-terminated copolymers of N-vinylpyrrolidone with one or more vinylic monomers, diamine- or dicarboxyl-terminated polyvinylalcohols, or diamine- or dicarboxyl-terminated copoymers of vinylacetate with one or more vinylic monomers.

6. The prepolymer of claim 1, wherein the at least one hydrophilic polymer with only one first or second functional group are monofunctional group-terminated poly(ethylene glycol) (PEG), monofunctional group-terminated PEG/PPG block copolymers, monofunctional group-terminated polyalkylacrylamides, monofunctional group-terminated polyalkylmethacrylamides, monofunctional group-terminated polyvinylpyrrolidones, monofunctional group-terminated copolymers of N-vinylpyrrolidone with one or more vinylic monomers, monoamine- or monocarboxyl-terminated polyvinylalcohols, and monoamine- or monocarboxyl-terminated copoymers of vinylacetate with one or more vinylic monomers.

* * * * *